United States Patent
Tsuzuki et al.

(10) Patent No.: US 10,072,692 B2
(45) Date of Patent: Sep. 11, 2018

(54) RESIN COMPONENT FASTENER STRUCTURE AND MOLDING DEVICE THEREFOR

(71) Applicants: Hiroaki Tsuzuki, Toyota (JP); Tomonori Yanagiya, Toyota (JP)

(72) Inventors: Hiroaki Tsuzuki, Toyota (JP); Tomonori Yanagiya, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 385 days.

(21) Appl. No.: 14/649,040

(22) PCT Filed: Apr. 1, 2013

(86) PCT No.: PCT/JP2013/060011
§ 371 (c)(1),
(2) Date: Jun. 2, 2015

(87) PCT Pub. No.: WO2014/087681
PCT Pub. Date: Jun. 12, 2014

(65) Prior Publication Data
US 2015/0308482 A1    Oct. 29, 2015

(30) Foreign Application Priority Data
Dec. 3, 2012 (JP) ................................. 2012-264523

(51) Int. Cl.
*F16B 43/02* (2006.01)
*F16B 29/00* (2006.01)
(Continued)

(52) U.S. Cl.
CPC ........ *F16B 29/00* (2013.01); *B29C 45/14065* (2013.01); *B29C 45/14311* (2013.01);
(Continued)

(58) Field of Classification Search
CPC .. B29C 45/14368; B29C 45/14; B29C 45/135
(Continued)

(56) References Cited

U.S. PATENT DOCUMENTS 4,044,512 A * 8/1977 Fischer ............... B23B 51/0027
425/110
5,076,760 A * 12/1991 Weetman ............ B01F 7/00016
264/155
(Continued)

FOREIGN PATENT DOCUMENTS

JP    S58-36901 U    3/1983
JP    H04-136304 U   12/1992
(Continued)

OTHER PUBLICATIONS

Jan. 5, 2017 Office Action issued in Chinese Patent Application No. 201380062974.6.
(Continued)

*Primary Examiner* — Gary W Estremsky
(74) *Attorney, Agent, or Firm* — Oliff PLC

(57) ABSTRACT

A fastening portion structure of a resin part including a tubular member integrally embedded therein by insert molding, and an insertion hole formed inside the tubular member, in which a screw member is inserted through the insertion hole, and the tubular member is compressed in an axial direction by the screw member, so that the resin part is fixed to a predetermined member. An inner peripheral surface of the tubular member is exposed in a region from one end to an intermediate position in the axial direction of the tubular member, but is covered by a resin in a region from the intermediate position to the other end, and the insertion hole is formed in a resin covering the inner peripheral surface of the tubular member.

5 Claims, 7 Drawing Sheets

(51) Int. Cl.
*F16B 19/02* (2006.01)
*B29C 45/14* (2006.01)
*B29L 31/00* (2006.01)
*F16B 5/02* (2006.01)
*B29L 9/00* (2006.01)

(52) U.S. Cl.
CPC ........ *B29C 45/14336* (2013.01); *F16B 19/02* (2013.01); *B29L 2009/00* (2013.01); *B29L 2031/7278* (2013.01); *F16B 5/025* (2013.01)

(58) Field of Classification Search
USPC .................. 411/546; 425/126.1; 277/593
See application file for complete search history.

(56) References Cited

U.S. PATENT DOCUMENTS

| | | | | |
|---|---|---|---|---|
| 8,439,220 | B2* | 5/2013 | Norman | F01D 11/00 220/228 |
| 8,747,040 | B2* | 6/2014 | Sjoeholm | F16B 35/00 411/337 |
| 2006/0056936 | A1* | 3/2006 | Ishimaru | F16B 41/002 411/81 |
| 2008/0157489 | A1* | 7/2008 | Kao | B25H 3/003 279/97 |

FOREIGN PATENT DOCUMENTS

| | | |
|---|---|---|
| JP | 2007-062040 A | 3/2007 |
| JP | 2012-232430 A | 11/2012 |

OTHER PUBLICATIONS

Aug. 4, 2016 Search Report issued in European Patent Application No. 13861191.8.
Jan. 12, 2016 Office Action issued in Japanese Patent Application No. 2012-264523.
Jul. 2, 2013 International Search Report issued in International Patent Application No. PCT/JP2013/060011.
May 5, 2016 Office Action issued in Chinese Patent Application No. 201380062974.6.
Jun. 7, 2016 Office Action issued in Japanese Patent Application No. 2012-264523.

* cited by examiner

RESIN COMPONENT FASTENER STRUCTURE AND MOLDING DEVICE THEREFOR

TECHNICAL FIELD

The present invention relates to fastening portion structures of resin parts, and more particularly to an improvement in a fastening portion structure in which a resin part has a tubular member embedded therein by insert molding and has an insertion hole formed inside the tubular member so that a screw member is inserted therethrough.

BACKGROUND ART

Fastening portion structures of resin parts are known in the art in which the resin part has a tubular member integrally embedded therein by insert molding, and has an insertion hole formed inside the tubular member so that a screw member is inserted therethrough, and the tubular member is compressed in the axial direction by the screw member, whereby the resin part can be fixed to a predetermined member (see Patent Document 1). A fastening portion 100 in FIG. 12 is an example of such a fastening portion structure. A resin part 102 has as the tubular member a cylindrical collar 104 integrally embedded therein by insert molding. The collar 104 has a plurality of through holes 106. A synthetic resin has flown into the collar 104 through the through holes 106, and the resin 108 inside the collar 104 has an insertion hole 110 formed substantially concentrically with the collar 104 so that a fastening bolt 112 as the screw member is inserted therethrough. The fastening bolt 112 inserted through the insertion hole 110 is screwed into a threaded hole 116 formed in a predetermined attachment member 114, and the collar 104 is compressed between a head of the fastening bolt 112 and the attachment member 114, whereby the resin part 102 is fixedly attached to the attachment member 114 via the collar 104. The size (radial dimension) and shape of the insertion hole 110 can be set as desired independently of the collar 104 when insert molding is performed.

RELATED ART DOCUMENTS

Patent Documents

Patent Document 1: Japanese Utility Model Application Publication No. H04-136304

SUMMARY OF THE INVENTION

Problems to be Solved by the Invention

As shown in, e.g., FIG. 13, when insert molding is performed so that the collar 104 is integrally embedded in the resin part 102 in such a conventional fastening portion 100, the collar 104 need be placed in a molding die 122 concentrically with a core 120 that is used to form the insertion hole 110. Positioning of the collar 104 is therefore a problem. One possible solution to this problem is to form in the molding die 122 a positioning hole 124 having substantially the same radial dimension as the outer diameter of the collar 104. In this case, however, manufacturing cost is increased accordingly. In addition, in the case of a transverse molding apparatus shown in FIG. 13, an attitude of the collar 104 is unstable and may be tilted as shown by a chain line. The attitude of the collar 104 is stabilized by increasing the depth of the positioning hole 124. However, this causes another problem that the collar 104 protrudes from the resin part 102 by an amount corresponding to the depth of the positioning hole 124. FIG. 13 is a view showing the stationary molding die 122, and a product cavity for molding the resin part 102 is formed around the collar 104 by clamping the stationary molding die 122 and a movable molding die, not shown.

The present invention was developed in view of the above circumstances, and it is an object of the present invention to allow a tubular member to be easily positioned with high accuracy in insert molding in a fastening portion structure in which a resin part includes a tubular member integrally embedded therein by insert molding, and a screw member is inserted through an insertion hole formed inside the tubular member.

Means for Solving the Problem

To achieve the object, the first aspect of the invention provides a fastening portion structure of a resin part, in which the resin part includes a tubular member integrally embedded therein by insert molding, and comprises an insertion hole formed inside the tubular member, a screw member is inserted through the insertion hole, and the tubular member is compressed in an axial direction by the screw member, so that the resin part is fixed to a predetermined member, the fastening portion structure characterized in that an inner peripheral surface of the tubular member is exposed in a region from one end to an intermediate position in the axial direction of the tubular member, but is covered by a resin in a region from the intermediate position to the other end, and the insertion hole is formed in a resin covering the inner peripheral surface of the tubular member.

The second aspect of the invention provides the fastening portion structure of a resin part recited in the first aspect of the invention, wherein the tubular member comprises a cutout at the other end, and a resin inside the tubular member is continuous with a resin outside the tubular member via the cutout.

The third aspect of the invention provides the fastening portion structure of a resin part recited in the first or second aspect of the invention, wherein (a) the tubular member comprises a cutout at each of both ends in the axial direction thereof and comprises a through hole in intermediate portion in the axial direction thereof, and a resin inside the tubular member is continuous with a resin outside the tubular member through a part of the cutouts and a part of the through hole, and (b) the cutouts and the through hole are formed so that the tubular member has a symmetrical shape with respect to center in the axial direction thereof.

The fourth aspect of the invention provides the fastening portion structure of a resin part recited in any one of the first to the third aspects of the invention, wherein an axial length S of the exposed region of the inner peripheral surface of the tubular member is ½ or more of an entire length L of the tubular member.

The fifth aspect of the invention provides a molding apparatus for molding a resin part comprising the fastening portion structure recited in any one of the first to the fourth aspects of the invention integrally with the tubular member by insert molding, the molding apparatus characterized by comprising: a core comprising (a) a positioning portion that has an outer peripheral shape corresponding to an inner peripheral shape of the tubular member, and that is relatively fitted in the tubular member to position the tubular member, and (b) a protruding molding portion that is formed integrally with the positioning portion so as to protrude in the axial direction from the positioning portion, and that is used to form the insertion hole, wherein (c) the positioning portion side of the core is fixedly attached to one of a pair of molding dies.

Effects of the Invention

In such a fastening portion structure of the resin part of the present embodiment, since the inner peripheral surface is exposed in the region from the one end to an intermediate position in the axial direction of the tubular member, for example, the positioning portion fitted into the tubular member is formed in the core for molding the insertion hole when insert molding is performed. Accordingly, the tubular member can be easily positioned relative to the core with high accuracy without forming a positioning hole in the molding dies. The inner peripheral surface is covered by the resin in the region from the intermediate position to the other end, and the insertion hole is formed in the resin covering the inner peripheral surface of the tubular member by the core. Therefore, the size and shape of the insertion hole can be set as desired independently of the tubular member by the core. That is, positioning of the tubular member can be ensured in the region from the one end to the intermediate position where the inner peripheral surface is exposed, and the size and shape of the insertion hole can be set as desired as in the conventional example in the region from the intermediate position to the other end where the resin covering the inner peripheral surface of the tubular member is provided.

In the second aspect of the invention, since the tubular member comprises a cutout at the other end, and the resin inside the tubular member is continuous with the resin outside the tubular member via the cutout, the resin covering the inner peripheral surface of the tubular member at the other end is satisfactorily kept in close contact with the tubular member, and the shape and dimension accuracy of the insertion hole can be appropriately ensured. That is, in the case of the fastening portion 100 having only the through holes 106 formed in an intermediate portion of the collar 104 as shown in FIG. 12, the resin at the ends in the axial direction of the fastening portion 100 is bonded to the collar 104 only by the adhesive force of the resin. Accordingly, as shown in FIG. 14 as an enlarged view of a portion XIV in FIG. 12, there is a risk that the end of the resin (corresponding to a resin covering an inner peripheral surface of a tubular member of the present application) 108 inside the collar 14 may be delaminated from the collar 104 and deformed inward, which may adversely affect the shape and dimension accuracy of the insertion hole 110.

In the third aspect of the invention, since the tubular member comprises the cutout at each of both ends in the axial direction thereof and comprises the through hole in intermediate portion in the axial direction thereof, and the resin inside the tubular member is continuous with the resin outside the tubular member through a part of the cutouts and a part of the through hole. This improves fluidity of the resin during insert molding, and the resin covering the inner peripheral surface of the tubular member having the insertion hole can be satisfactorily molded, and as in the second aspect of the invention, deformation of the end portion of the resin covering the inner peripheral surface of the tubular member is prevented and the shape and the dimension accuracy of the insertion hole are appropriately ensured. Since the cutouts and the through holes are formed so that the tubular member has a symmetrical shape with respect to its center in the axial direction, orientation in the axial direction of the tubular member need not be considered when placing the tubular member on the molding dies for insert molding. This prevents wrong assembly and improves workability.

In the fourth aspect of the invention, since the axial length S of the exposed region of the inner peripheral surface of the tubular member is ½ or more of the entire length L of the tubular member, for example, when the tubular member is fitted on the positioning portion of the core for insert molding, a half or more of the tubular member is supported by the positioning portion, and an attitude of the tubular member is stabilized even in the transverse molding apparatus. The fastening portion of the resin part can thus be molded with high accuracy including position accuracy of the tubular member. Moreover, since there can be a clearance between the tubular member and the positioning portion, dimensional requirements for the tubular member are relaxed, and manufacturing cost can be reduced.

The fifth aspect of the invention concerns a molding apparatus for molding a resin part comprising the fastening portion structure recited in any one of the first to the fourth aspects of the invention integrally with the tubular member by insert molding, and substantially, the same effect as the first to the fourth aspects of the invention can be obtained. Moreover, the molding apparatus uses the core comprising the positioning portion that is fitted in the tubular member to position the tubular member and the protruding molding portion that is formed integrally with the positioning portion and that is used to form the insertion hole. The molding apparatus can therefore be easily configured at low cost.

MODES FOR CARRYING OUT THE INVENTION

Figure 1:
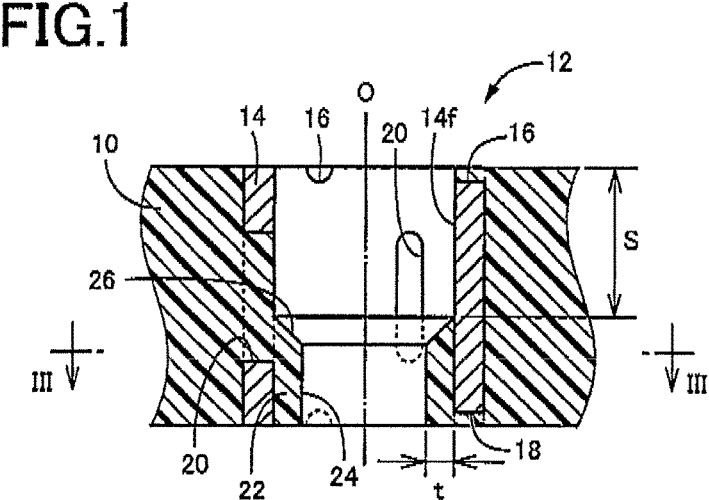
FIG. 1 is a view illustrating a fastening portion structure according to an embodiment of the present invention, which is a longitudinal section taken along line I-I and viewed in the direction of arrows in FIG. 2.

A cylindrical member made of a metal such as a steel pipe is preferably used as the tubular member embedded in the resin part. However, a rolled steel plate or a tubular member having a tubular shape with a polygonal cross section such as a quadrilateral cross section, a hexagonal cross section, etc. may be used as the tubular member embedded in the resin part. The tubular member need not necessarily have a fully closed section. For example, in the case of using the rolled steel plate, the tubular member may have an open section with clearance formed along its entire length in the axial direction, and the resin may flow into the tubular member through the clearance to mold the resin covering the inner peripheral surface of the tubular member.

The insertion hole is formed in the resin covering the inner peripheral surface of the tubular member that covers the inner peripheral surface of the tubular member. The size and shape of the insertion hole can be set as desired independently of the tubular member. For example, the insertion hole typically has a circular shape, but may have various shapes such as an elliptical shape, an elongated circular shape, and a track shape. In order to use the tubular member having as small a diameter as possible, the resin covering the inner peripheral surface of the tubular member desirably has as small a thickness as possible in such a range that allows the insertion hole to be formed therein and that allows the resin to flow during molding. For example, an appropriate thickness of the resin covering the inner peripheral surface of the tubular member is about 1 mm, although it depends on the type of resin. That is, the radial dimension of the tubular member is set as appropriate according to the size of the insertion hole in such a range that can ensure that the resin covering the inner peripheral surface of the tubular member has a thickness of about 1 mm.

The axial length S of the exposed portion of the inner peripheral surface of the tubular member is desirably ½ or more of the entire length L of the tubular member. However, even if the axial length S is smaller than ½ of the entire length L, the tubular member can be appropriately positioned by, e.g., providing the positioning portion substantially in close contact with the inner peripheral surface. The inner peripheral surface is exposed in order to position the tubular member from its inner peripheral side when performing insert molding, and the axial length S and dimensional requirements for the positioning portion are determined as appropriate in such a range that predetermined positioning accuracy is achieved. Depending on the dimensional requirements, a thin layer of the resin may adhere to the exposed portion of the inner peripheral surface.

In the second aspect of the invention, the tubular member has the cutout at the other end, and the resin inside the tubular member is continuous with the resin outside the tubular member. However, when carrying out other aspects of the invention, only the through hole may be formed in the intermediate portion of the tubular member in such a range that the resin covering the inner peripheral surface of the tubular member can be molded. In the case of the tubular member having an open section with clearance formed along its entire length in the axial direction, the resin can flow along the entire length, and the cutout and the through hole therefore need not necessarily be formed. The cutout may be formed only at one position in an edge. However, it is desirable to form, e.g., a plurality of cutouts at equal angular intervals about an axis. The same applies to the cutout and the through hole of the third aspect of the invention. The cutout may have various sectional shapes such as a semicircular shape, a V-shape, a U-shape, or a slit shape having a predetermined length in the axial direction.

In the third aspect of the invention, the cutouts and the through hole are formed so that the tubular member has a symmetrical shape with respect to its center in the axial direction. However, when carrying out other aspects of the invention, the cutout and the through hole may be formed only at the other end where the resin covering the inner peripheral surface of the tubular member is provided. The through hole may have various shapes such as a circular hole, a hole with a polygonal cross section, or an elongated circular hole that is longer in the axial direction. A plurality of through holes may be formed so as to be separated from each other in a circumferential direction, or a plurality of through holes may be formed so as to be separated from each other in the axial direction.

EMBODIMENTS

Embodiments of the present invention will be described in detail below with reference to the accompanying drawings.

Figure 2:
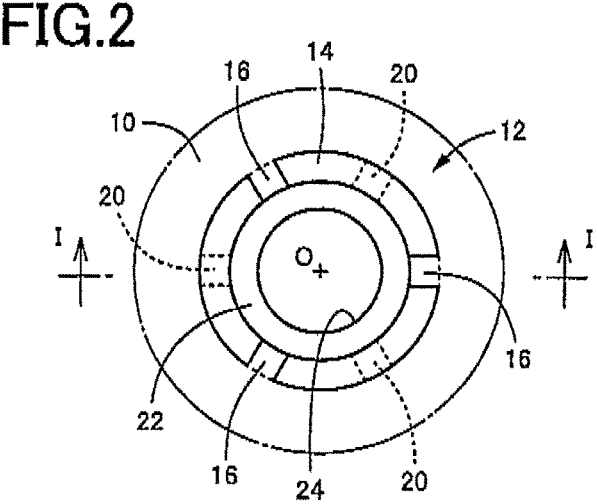
FIG. 2 is a plan view of a portion near the fastening portion of FIG. 1, as viewed from the axial direction.
Figure 3:
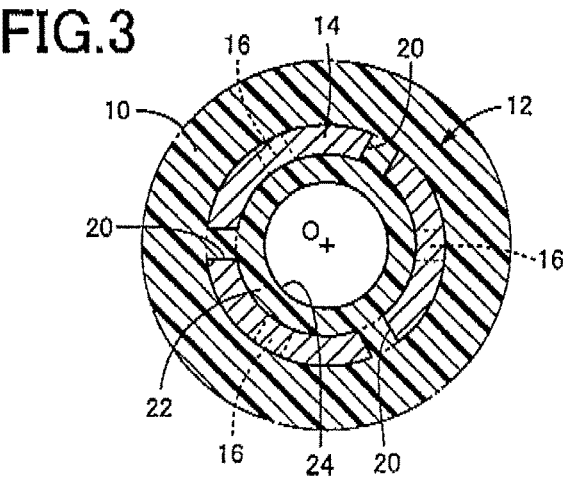
FIG. 3 is a transverse section taken along line III-III and viewed in the direction of arrows in FIG. 1.
Figure 4:
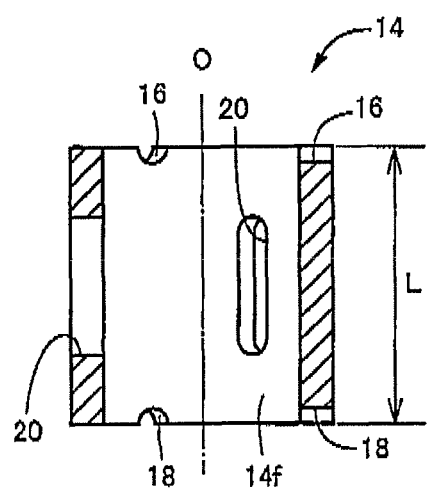
FIG. 4 is a view showing only a collar used in the fastening portion of FIG. 1, which is a longitudinal section taken along line IV-IV and viewed in the direction of arrows in FIG. 5.
Figure 5:
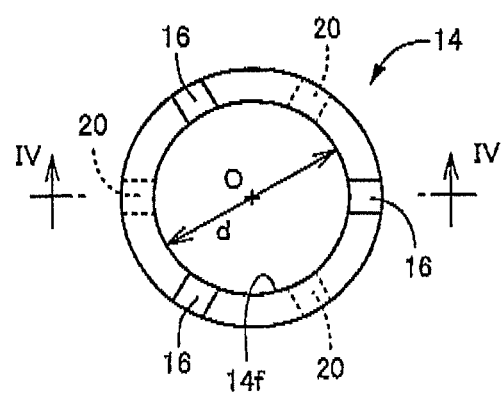
FIG. 5 is a plan view of the collar in FIG. 4 as viewed in the axial direction.

FIG. 1 is a view illustrating a fastening portion structure according to an embodiment of the present invention, which is a longitudinal section of a fastening portion 12 provided in a resin part 10, as taken along line I-I and viewed in the direction of arrows in FIG. 2. FIG. 2 is a plan view of a portion near the fastening portion 12 of FIG. 1, as viewed from above in the axial direction. FIG. 3 is a transverse section taken along line III-III and viewed in the direction of arrows in FIG. 1. FIG. 4 is a view showing only a collar 14 used in the fastening portion 12, which is a longitudinal section taken along line IV-IV and viewed in the direction of arrows in FIG. 5. FIG. 5 is a plan view of the collar 14 in FIG. 4 as viewed in the axial direction. The collar 14 corresponds to a tubular member, and is a cylindrical steel pipe in the present embodiment.

In the fastening portion 12, the resin part 10 includes the collar 14 integrally embedded therein by insert molding. The collar 14 has cutouts 16, 18 at its one end and the other end in the axial direction, and has through holes 20 in its intermediate portion in the axial direction. The cutouts 16 and the cutouts 18 have a semicircular section and are formed at three positions at equal angular intervals about an axis O. The three cutouts 16 are formed at the same positions about the axis O as the three cutouts 18. The through holes 20 have an elongated circular shape that is longer in the axial direction, and are formed at three positions at equal angular intervals about the axis O. In the present embodiment, the through holes 20 are formed at intermediate positions shifted by 60° about the axis O with respect to the cutouts 16, 18.

Each of the three through holes 20 is formed in the central portion in the axial direction of the collar 14, and the collar 14 thus has a symmetrical shape with respect to its center in the axial direction.

All of the cutouts 16, 18 and the through holes 20 are filled with a synthetic resin that forms the resin part 10. The synthetic resin flows into the collar 14 through the cutouts 18 and the through holes 20. A cylindrical inner surface-covering resin (a resin covering an inner peripheral surface of a tubular member) 22 is thus formed so as to cover an inner peripheral surface 14f of the collar 14. The inner surface-covering resin 22 is continuous with the synthetic resin outside the collar 14 via the cutouts 18 and the through holes 20, and an insertion hole 24 having a circular section is formed inside the inner surface-covering resin 22 substantially concentrically with the collar 14. The inner surface-covering resin 22 only extends from the end on the cutout 18 side to an intermediate position in the axial direction, and the inner peripheral surface 14f of the collar 14 is exposed in a region along an axial length S on the opposite side (at the one end). The inner surface-covering resin 22 has as small a thickness t as possible in such a range that allows the synthetic resin to flow to mold the inner surface-covering resin 22, and the thickness t is about 1 mm in the present embodiment. A stepped portion 26 at an end of the inner surface-covering resin 22, namely on the through hole 20 side, has a tapered surface so that the amount by which the inner surface-covering resin 22 protrudes radially inward decreases gradually toward the exposed portion of the inner peripheral surface 14f.

Figure 7:
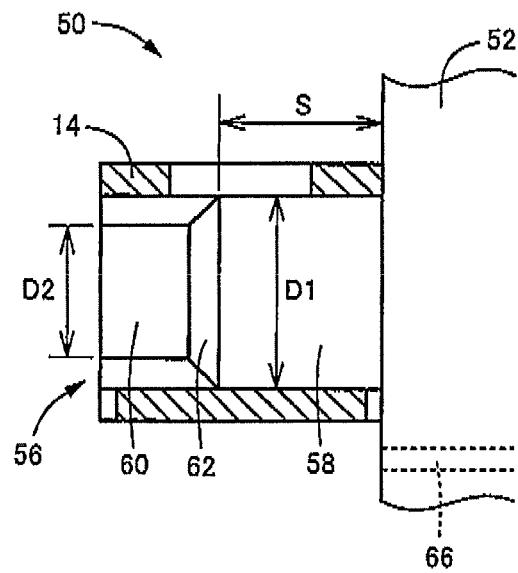
FIG. 7 is a view for explaining a molding apparatus for molding a resin part having the fastening portion of FIG. 1 integrally with the collar by insert molding, a front view of a state where the collar is fitted on the core provided on the stationary molding die.
Figure 8:
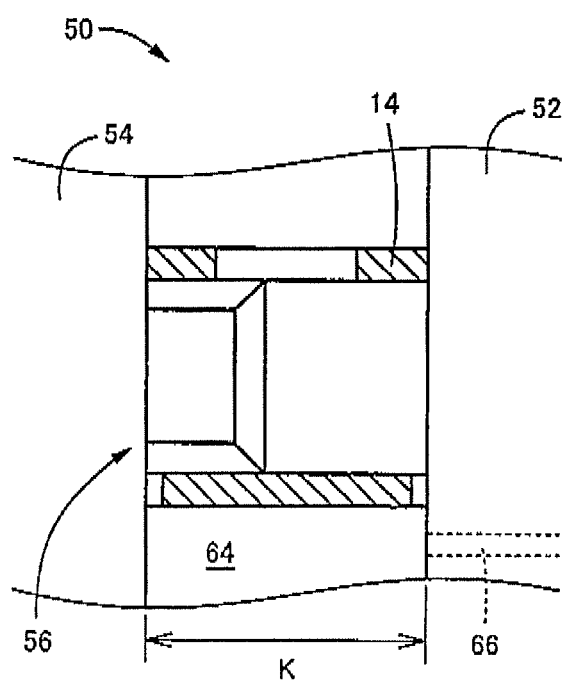
FIG. 8 is a front view showing a state where a movable molding die and the stationary molding die of FIG. 7 are clamped with the movable molding die moved to the stationary molding die.
Figure 9:
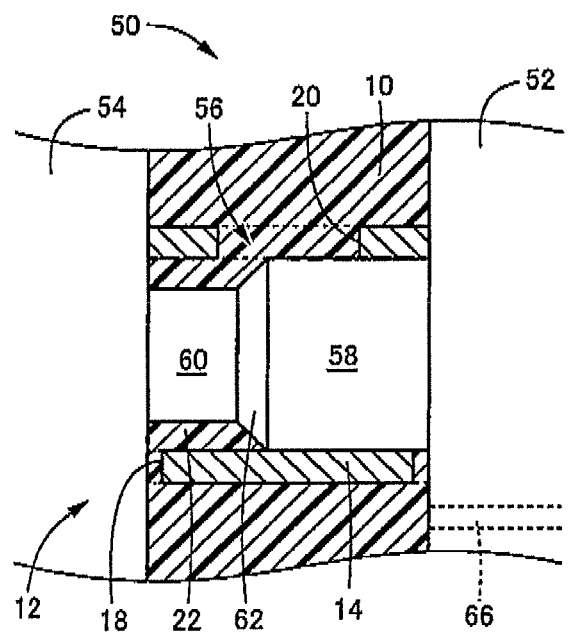
FIG. 9 is a front view of a state where a molten resin is injected in a product cavity of FIG. 8 to mold the resin part.

The resin part 10 having such a fastening portion 12 is molded integrally with the collar 14 by insert molding by using, e.g., a molding apparatus 50 shown in FIGS. 7 to 9. The molding apparatus 50 is a transverse molding apparatus having a stationary molding die 52 and a movable molding die 54. The stationary molding die 52 includes a core 56 that positions and supports the collar 14 and that is used to form the insertion hole 24. The core 56 has a positioning portion 58 that has an outer peripheral shape corresponding to an inner peripheral shape of the collar 14, namely has a columnar shape with a large diameter, and that is relatively fitted in the collar 14 to position the collar 14, and a protruding molding portion 60 that has a columnar shape with a small diameter, that is formed integrally with the positioning portion 58 so as to protrude in the axial direction from the positioning portion 58, and that is used to form the insertion hole 24. The positioning portion 58 side of the core 56 is fixedly attached to the molding die 52. The axial length of the positioning portion 58 is the same as the axial length S of the exposed portion of the inner peripheral surface 14f. The axial length S is ½ or more of an entire length L of the collar 14, and as shown in FIG. 7, a half or more of the collar 14 is fitted on and stably supported by the positioning portion 58. A radial dimension D1 of the positioning portion 58 is the same as or slightly smaller than an inner diameter d of the collar 14, so that the positioning portion 58 can substantially concentrically position the collar 14. A radial dimension D2 of the protruding molding portion 60 is the same as that of the insertion hole 24, and a tapered portion 62 whose radial dimension decreases gradually is provided at the boundary between the positioning portion 58 and the protruding molding portion 60. FIG. 7 is a front view showing a state where the collar 14 is fitted on the core 56.

FIG. 8 is a front view showing a state where the movable molding die 54 and the stationary molding die 52 are clamped with the movable molding die 54 moved to the stationary molding die 52. A product cavity 64 corresponding to the resin part 10 is thus formed between the molding dies 52, 54. In this clamped state, a distance K between the molding dies in a portion for molding the fastening portion 12 is the same as the axial length of the core 56, and is the same as or slightly smaller than the entire length L of the collar 14. The collar 14 contacts both of the pair of molding dies 52, 54. A target value of the distance K between the molding dies is, e.g., the lower limit of tolerance of the entire length L of the collar 14, so that the entire length L becomes equal to the distance K between the molding dies when the collar 14 is compressed by a mold clamping force. Molten resin is injected through a gate 66 provided in the molding die 52. As shown in FIG. 9, the product cavity 64 is thus filled with the molten resin, and the molten resin also flows into the collar 14 through the cutouts 18 and the through holes 20 of the collar 14, whereby the resin part 10 is molded which has the fastening portion 12 including the collar 14 embedded therein and having the inner surface-covering resin 22 formed inside the collar 14. Providing the tapered portion 62 in the core 56 allows the molten resin that has flown into the collar 14 through the through holes 20 to further flow satisfactorily into an annular space between the protruding molding portion 60 and the collar 14, so that the inner surface-covering resin 22 is satisfactorily molded. Since both ends of the collar 14 contact the pair of molding dies 52, 54, both end faces of the collar 14 in the resin part 10 are exposed to the outside.

Figure 6:
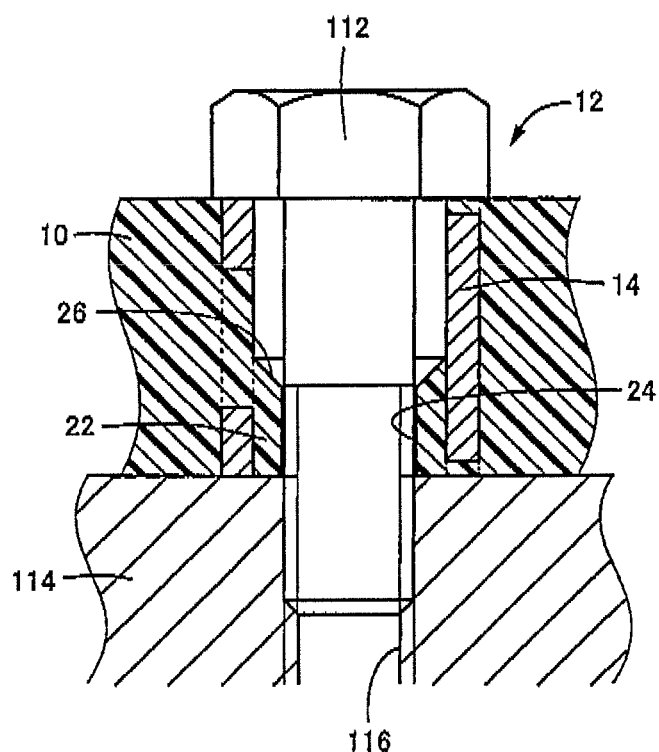
FIG. 6 is a longitudinal section illustrating a state where a resin part is fixed to a predetermined attachment member via the fastening portion of FIG. 1.

Such a resin part 10 is fixedly attached to an attachment member 114 via the fastening portion 12 as shown in, e.g., FIG. 6. A fastening bolt 112 as a screw member is inserted into the collar 14, is inserted through the insertion hole 24 in the inner surface-covering resin 22 provided in the collar 14, and is screwed into a threaded hole 116. Since the stepped portion 26 of the insertion hole 24 has the tapered surface, a tip end of the fastening bolt 112 is guided by the stepped portion 26 and inserted into the insertion hole 24. As the fastening bolt 112 is thus screwed into the threaded hole 116 and tightened, the collar 14 is compressed between a head of the fastening bolt 112 and the attachment member 114, and the resin part 10 is fixedly attached to the attachment member 114 via the collar 14.

Figure 13:
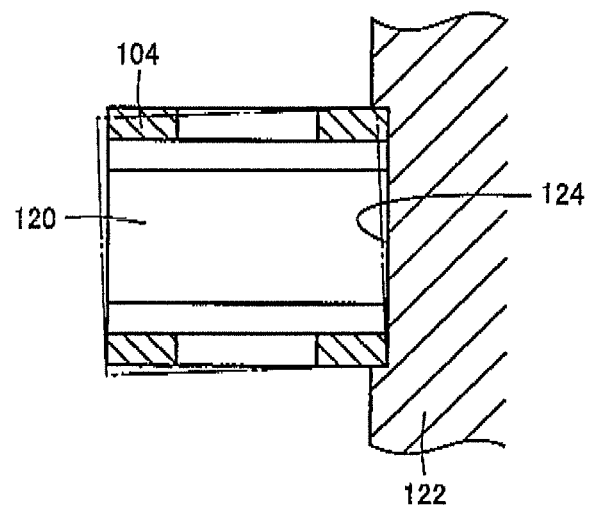
FIG. 13 is a view for explaining a molding apparatus for molding a resin part having the fastening portion of FIG. 12 integrally with the collar by insert molding, a front view of a state where the collar is fitted around the core provided on the stationary molding die.

In such a fastening portion structure of the resin part 10 of the present embodiment, the inner peripheral surface 14f is exposed in the region from the one end to an intermediate position in the axial direction of the collar 14. The collar 14 can therefore be positioned from inside by the positioning portion 58 of the core 56 provided to form the insertion hole 24, when molding the resin part 10 by insert molding as shown in FIG. 7 to FIG. 9. The collar 14 can thus be easily positioned with high accuracy without the need to form a positioning hole 124 shown in FIG. 13. The inner peripheral surface 14f is covered by the inner surface-covering resin 22 in the region from the intermediate position to the other end, and the insertion hole 24 is formed in the inner surface-covering resin 22 by the core 56. The size and shape of the insertion hole 24 can therefore be set as desired independently of the collar 14. That is, positioning of the collar 14 can be ensured in the region from the one end to the intermediate position where the inner peripheral surface 14f is exposed, and the size and shape of the insertion hole 24 can be set as desired as in the conventional example in the region from the intermediate position to the other end where the inner surface-covering resin 22 is provided.

Figure 14:
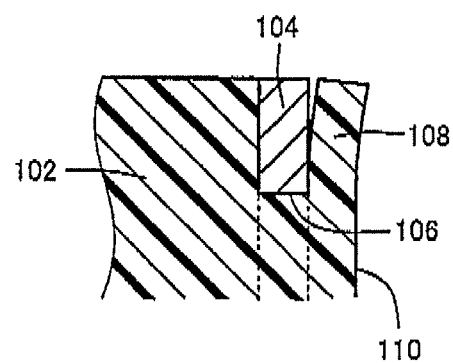
FIG. 14 is an enlarged cross sectional view of a portion XIV of FIG. 12, which is a view illustrating a case that the resin inside the collar is delaminated and deformed.

The collar 14 comprises the cutouts 18 at its end, and the synthetic resin inside the collar 14 is continuous with the synthetic resin outside the collar 14 through the cutouts 18. Accordingly, for example, there is no risk that the end of resin 108 may be delaminated from a collar 104 and deformed inward as shown in FIG. 14. The inner surface-covering resin 22 is satisfactorily kept in close contact with the collar 14, and the shape and dimension accuracy of the insertion hole 24 can be appropriately ensured.

The collar 14 comprises the cutouts 16, 18 at its both ends in the axial direction, and comprises the through holes 20 in its intermediate portion in the axial direction, and in the present embodiment, the synthetic resin inside the collar 14 is continuous with the synthetic resin outside the collar 14 through the cutouts 18 and the through holes 20. This improves fluidity of the molten resin during insert molding, and the inner surface-covering resin 22 having the insertion hole 24 can be satisfactorily molded. Since the cutouts 16, 18 and the through holes 20 are formed so that the collar 14 has a symmetrical shape with respect to its center in the axial direction, orientation in the axial direction of the collar 14 need not be considered when placing the collar 14 on the core 56 of the molding die 52 for insert molding. This prevents wrong assembly and improves workability.

The axial length S of the exposed portion of the inner peripheral surface 14f of the collar 14 is ½ or more of the entire length L. When the collar 14 is fitted on the positioning portion 58 of the core 56, a half or more of the collar 14 is supported by the positioning portion 58, and an attitude of the collar 14 is stabilized even in the transverse molding apparatus 50. The fastening portion 12 of the resin part 10 can thus be molded with high accuracy including position accuracy of the collar 14. Moreover, since there can be clearance between the collar 14 and the positioning portion 58, dimensional requirements for the collar 14 are relaxed, and manufacturing cost can be reduced.

The molding apparatus 50 of the present embodiment uses the core 56 comprising the positioning portion 58 that is fitted in the collar 14 to position the collar 14 and the protruding molding portion 60 that is formed integrally with the positioning portion 58 and that is used to form the insertion hole 24. The molding apparatus 50 can therefore be easily configured at low cost.

Figure 10:
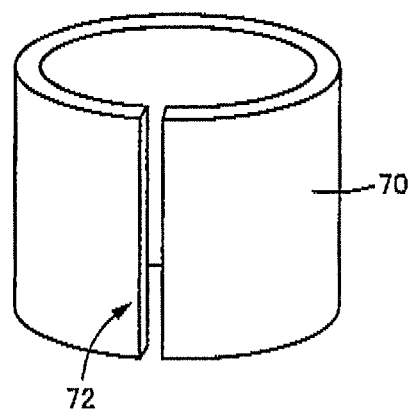
FIG. 10 is a view for explaining another example of the present invention, which is a perspective view showing another example of the tubular member.

The collar 14 formed of a steel pipe with a closed section is used in the above embodiment. However, as shown in FIG. 10, for example, a tubular member 70 with an open section, which is formed by rolling a steel plate into a cylindrical shape so that it has clearance 72 along its entire length in the axial direction, may be used instead of the collar 14 to form the fastening portion 12. In this case as well, the cutouts 16, 18 and the through holes 20 can be formed in the tubular member 70. However, the cutouts 16, 18 and the through holes 20 may not be formed, and the inner surface-covering resin 22 may be molded only with molten resin flowing through the clearance 72.

Figure 11:
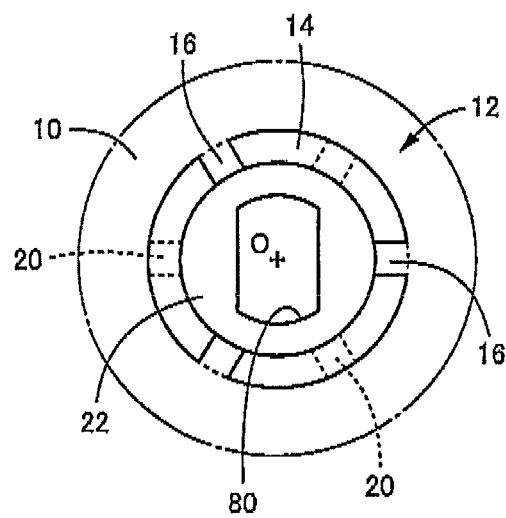
FIG. 11 is a view for explaining yet another example of the present invention that is different in the shape of the insertion hole, which is a plan view corresponding to FIG. 2.
Figure 12:
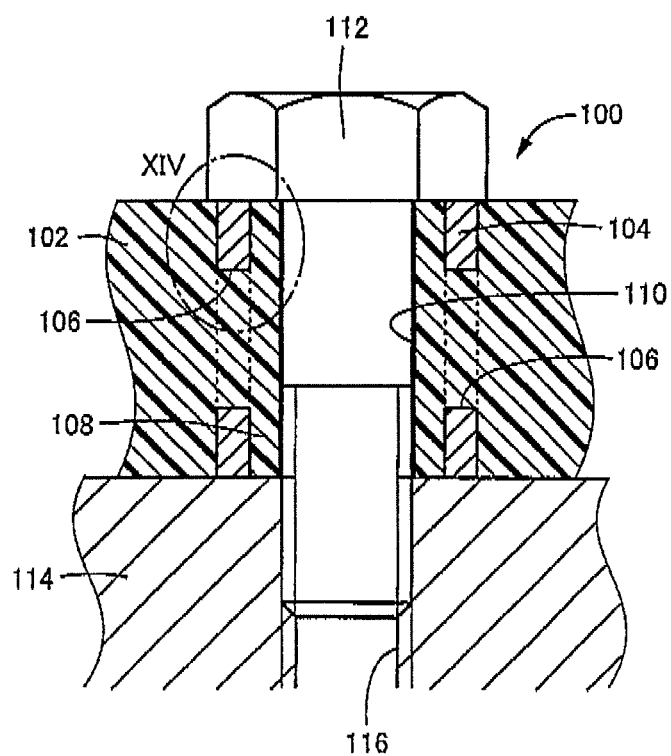
FIG. 12 is a view for explaining an example of a conventional fastening portion structure, which is a longitudinal section corresponding to FIG. 6.

The circular insertion hole 24 is formed in the inner surface-covering resin 22 in the above embodiment. However, as shown in FIG. 11, for example, a track-shaped insertion hole 80 may be formed in the inner surface-covering resin 22.

Although the embodiments of the present invention are described above in detail based on the drawings, the embodiments are shown by way of example only, and the present invention can be embodied in various modified or improved forms based on the knowledge of those skilled in the art.

NOMENCLATURE OF ELEMENTS

10: resin part 12: fastening portion 14: collar (tubular member) 14f: inner peripheral surface 16, 18: cutout 20: through holes 22: inner surface-covering resin 24, 80: insertion hole 50: molding apparatus 52, 54: molding die 56: core 58: positioning portion 60: protruding molding portion 70: tubular member 112: fastening bolt (screw member) 114: attachment member (member)

The invention claimed is:

1. A fastening portion structure of a resin part including a tubular member integrally embedded therein by insert molding, and an insertion hole formed inside the tubular member, wherein a screw member is inserted through the insertion hole, and the tubular member is compressed in an axial direction by the screw member, so that the resin part is fixed to a predetermined member, and wherein
an inner peripheral surface of the tubular member is exposed in a region from one end to an intermediate position in the axial direction of the tubular member, but is covered by a resin in a region from the intermediate position to the other end, and the insertion hole is formed in a resin covering the inner peripheral surface of the tubular member,
the tubular member comprises a cutout at an edge of the tubular member,
a resin inside the tubular member is continuous with a resin outside the tubular member via the cutout formed at the edge of the tubular member,
an axial length of the cutout is shorter than an entire length L of the tubular member,
the tubular member comprises the cutout at each of both ends in the axial direction thereof and comprises a through hole in intermediate portion in the axial direction thereof, and the resin inside the tubular member is continuous with the resin outside the tubular member through a part of the cutouts and a part of the through hole, and
the cutouts and the through hole are formed so that the tubular member has a symmetrical shape with respect to center in the axial direction thereof.

2. The fastening portion structure of a resin part according to claim 1, wherein
the tubular member comprises the cutout at the other end, and the resin inside the tubular member is continuous with the resin outside the tubular member via the cutout formed at the other end of the tubular member.

3. The fastening portion structure of a resin part according to claim 1, wherein
an axial length S of the exposed region of the inner peripheral surface of the tubular member is ½ or more of the entire length L of the tubular member.

4. A molding apparatus for molding a resin part comprising the fastening portion structure according to claim 1 integrally with the tubular member by insert molding, the molding apparatus comprising:
a core comprising
a positioning portion that has an outer peripheral shape corresponding to an inner peripheral shape of the tubular member, and that is relatively fitted in the tubular member to position the tubular member, and
a protruding molding portion that is formed integrally with the positioning portion so as to protrude in the axial direction from the positioning portion, and that is used to form the insertion hole, wherein
the positioning portion side of the core is fixedly attached to one of a pair of molding dies.

5. The fastening portion structure of a resin part according to claim 1, wherein an outer peripheral surface as a whole of the tubular member is covered by the resin.

* * * * *